United States Patent
Beck et al.

(10) Patent No.: US 8,792,364 B2
(45) Date of Patent: Jul. 29, 2014

(54) CONFIGURATION OF ACCESS POINTS IN A TELECOMMUNICATIONS NETWORK

(75) Inventors: Roger Beck, Newbury (GB); Toby Proctor, Salisbury (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 701 days.

(21) Appl. No.: 12/736,336

(22) PCT Filed: Mar. 30, 2009
(Under 37 CFR 1.47)

(86) PCT No.: PCT/EP2009/053733
§ 371 (c)(1),
(2), (4) Date: Apr. 22, 2011

(87) PCT Pub. No.: WO2009/121833
PCT Pub. Date: Oct. 8, 2009

(65) Prior Publication Data
US 2012/0140642 A1    Jun. 7, 2012

(30) Foreign Application Priority Data
Mar. 31, 2008   (GB) .................................. 0805768.9

(51) Int. Cl.
*H04W 24/00* (2009.01)
*H04W 16/18* (2009.01)

(52) U.S. Cl.
USPC ............................ 370/252; 370/310; 370/341

(58) Field of Classification Search
USPC .................................... 370/252, 254; 455/423
See application file for complete search history.

(56) References Cited

U.S. PATENT DOCUMENTS 7,184,770 B1 *   2/2007   Narasimhan et al. ......... 455/446
(Continued)

FOREIGN PATENT DOCUMENTS

| GB | 2430839 | 4/2007 |
|---|---|---|
| WO | WO 2004/040938 | 5/2004 |
| WO | WO 2005/069519 | 7/2005 |

OTHER PUBLICATIONS

ETSI TS 123 236 V7.0.0 (Jun. 2007), Digital cellular telecommunications system (Phase 2+); Universal Mobile Telecommunications System (UMTS); Intra-domain connection of Radio Access Network (RAN) nodes to multiple Core Network (CN) nodes (3GPP TS 23.236 version 7.0.0 Release 7), 39 pp.

(Continued)

*Primary Examiner* — Yemane Mesfin
*Assistant Examiner* — Henry Baron
(74) *Attorney, Agent, or Firm* — Muirhead and Saturnelli, LLC

(57) ABSTRACT

A GSM or UMTS mobile telecommunications network is provided including a radio access network comprising macro base stations with additional access points. The access points are connected to a network core via a hub and a concentrator and may appear to a mobile terminal as a conventional base station that communicates with the mobile terminal using GSM or UMTS protocols and does not require modification to a standard GSM or UMTS mobile terminal. The access points are associated as a cluster. A procedure includes performing initial configuration of the access points such that one or more of the access points operates in a transmit mode while the other access points operate in a receive mode only. The strength of the received signal is processed by a processor associated with the concentrator which calculates and provides parameters to each of the access points to provide optimum radio coverage within premises.

23 Claims, 5 Drawing Sheets

(56) References Cited

U.S. PATENT DOCUMENTS

| | | |
|---|---|---|
| 2003/0119511 A1 | 6/2003 | Shin |
| 2006/0218393 A1* | 9/2006 | Hernandez et al. ............ 713/167 |
| 2007/0263587 A1 | 11/2007 | Savoor et al. |
| 2008/0089287 A1* | 4/2008 | Sagfors et al. ................ 370/331 |
| 2008/0274745 A1* | 11/2008 | Barak et al. ................... 455/447 |
| 2012/0236731 A1* | 9/2012 | Beaudin ........................ 370/248 |

OTHER PUBLICATIONS

ETSI TS 125 331 V.8.1.0 (Jan. 2008), Universal Mobile Telecommunications System (UMTS); Radio Resource Control (RRC); Protocol specification (3GPP TS 25.331 version 8.1.0 Release 8), p. 1-50.

NTT DOCOMO: "Clarification of functions for self-optimization and self-configuration," $3^{rd}$ Generation Partnership Project (3GPP), Technical Specification Group (TSG) Radio Access Network (RAN); Working Group 3 (WG3), No. R3-061509, Oct. 13, 2006, 3 pp.

* cited by examiner

CONFIGURATION OF ACCESS POINTS IN A TELECOMMUNICATIONS NETWORK

TECHNICAL FIELD

This application relates to a method of providing telecommunications network radio coverage in a region and to a telecommunications network for providing radio coverage in a region, the network comprising a plurality of access points.

BACKGROUND TO THE INVENTION

There have recently been proposals to allow access to the features and services provided by GSM (Global System for Mobile communications) and UMTS (Universal Mobile Telecommunication Services) networks other than by accessing those networks in the conventional manner. In this regard, the conventional manner involves signalling between the mobile terminal and a standard base station (macro base station) that has a dedicated backhaul connection to an MSC (Mobile Switching Centre), and provides coverage in the cell occupied by the mobile terminal using cellular telecommunication (e.g. GSM or UMTS) transport protocols.

To increase network capacity, it has been proposed to provide additional special base stations, often referred to as femto cells, femto base stations, pico cells, pico base stations or access points (APs). These special base stations may be a dedicated network access point, or may be enhanced wireless internet hubs (i.e. providing wireless internet access, as well as wireless telecommunications network access). The range of special base stations is significantly smaller than macro base stations, typically only providing coverage of the order of 20 to 30 meters, making them suitable for use, for example at a subscriber's home or office.

An advantage of using an Access Point connected to the core network via an IP network is that existing broadband DSL connections, or any other IP connection, can be used to link mobile terminals with the network core without using the capacity of the radio access network or transmission network of a mobile telecommunications network. In this regard, these access points communicate with the core network via IP based communications, such as a (fixed) broadband IP network, and are typically routed via the Internet. Using such base stations will allow a proportion of the data required for the provision of features or services to be carried through a fixed network and onto the backhaul network without requiring Macro radio network capacity.

They are also able to provide mobile network access where there is no conventional radio access network coverage. For example, UMTS coverage could be provided by an access point where there is no conventional UMTS coverage.

It has also been proposed to use these APs in the Long Term Evolution (LTE) telecommunications network which is currently being developed. An industry body, 3GPP (Third Generation Partnership Project) is overseeing the production of technical specifications for implementing this next generation mobile system, which is based on an evolved GSM core network. LTE is likely to be the next network implementation after the current 3G UMTS etc.

In future networks, there is likely to be a heterogeneous mixture of Access Points covering a single building, micro base stations serving very small areas and macro Access Points serving significantly larger areas. These Access Points will coexist with the conventional base stations with the coverage area of one macro base station likely to overlap with a number of Access Points. Overall, the use of APs as an additional or alternative means for accessing the network will advantageously increase the network capacity and coverage.

In a conventional mobile telecommunications network the number of macro base stations provided will typically be of the order of 10,000. The location, orientation and power of each macro station is carefully planned by a laborious manual process requiring skilled personnel (a cellular network planning specialist). Typically, to correctly set up each macro base station takes perhaps one to three man days. Whilst this is acceptable for a mobile telecommunications network comprising only macro base stations, where the total number of base stations is limited, this is not satisfactory for a mobile telecommunications network comprising a large number of access points. There may be ten or a hundred times as many access points as macro base stations in the mobile telecommunications network in the future. Requiring skilled personnel to perform a laborious set up procedure for each access point is not feasible.

Arrangements for automatically configuring access points are known. One such procedure is described in GB-A-2430839. In such an arrangement, after authentication of an access point, the access point monitors each of the UMTS carriers and scrambling codes provided in a permitted list in turn, and measures the carrier to interference ratio (C/I ratio). The access point then selects the UMTS carrier and scrambling code within the permitted list with minimum received power from surrounding base stations on the basis that these carriers will cause minimum interference to surrounding base stations. The access point then selects initial power levels for the UMTS transmit paths. An appropriate initial power level is deduced from the received signal strength detected by the access point. The goal is that the transmitted power level is sufficient to provide a cellular service at a distance of 20 meters with the level of in-band interference caused by surrounding base stations. Transmit power may be modified during a call to maintain acceptable quality of service (QoS) in accordance with the UMTS standards. Such an access point may, when performing measurements of surrounding base stations, detect both macro base stations and other access points.

Mobile networks such as 2G (GSM), 3G (UMTS) or future LTE telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

The mobile terminal or network determines whether a handover/cell reselection procedure should be triggered in dependence upon measurements of the radio signals of the cells in the region of the mobile terminal. A filter is applied to the signals (either by the network or by the mobile terminal) which calculates an average (mean) value of these signals over a particular time period. This filtered/average values of the cells are then compared with each other or with a threshold value. In dependence upon these comparisons, cell reselection/handover related procedures are triggered. This cell reselection/handover process generally comprises taking radio signal measurements of neighbouring cells and comparing these to each other and to the radio signal of the current cell to determine which cell provides the best signal strength/quality. Handover/reselection to the best cell can then occur.

It is proposed that, in a cellular network including both access points and conventional macro base stations, a mobile terminal will be able to move between access points and macro base stations in order to provide the best radio coverage in the circumstances. Reselection between an access point and a macro base station, and vice versa, is possible, as is handover from a macro base station to an access point, and vice versa.

The present inventors have identified that in some circumstances it may be desirable to cover a particular area with a plurality of access points—for example, to provide radio coverage in an office that is of a size such that a single access point would be insufficient. The present inventors have further identified that problems can arise when a plurality of access points are activated in the same area and attempt to automatically configure themselves. During this automatic configuration process, each access point will take into account the radio signals transmitted by the other access points. The automatic procedure can cause the access points to "compete" or "race" with each other to establish an appropriate initial power level. The configuration process may take a large amount of time, or may never be completed, as the parameters measured by each access point will vary as the neighbouring access points vary their transmit powers in their attempts to configure themselves.

Embodiments of the system described herein seek to provide an improved arrangement for providing radio coverage in an area served by a plurality of access points.

SUMMARY OF THE INVENTION

According to system described herein, there is provided a method of providing telecommunications network radio coverage in a region, the method including providing a plurality of associated access points; and performing a configuration procedure by causing one or more of the plurality of access points to transmit in turn whilst the others of said access points are caused to receive only and to measure the received signal at each of the other of the access points, calculating the optimum parameters for each of said access points on the basis of the measurements, and configuring each of said access points in accordance with the calculated parameters.

The access points may be IP-transport connected base stations and may be connected to a core of the telecommunications network by a DSL broadband connection. The telecommunications network may comprise a cellular telecommunications network including the aforesaid access points and the plurality of conventional macro base stations—such as GSM or UMTS base stations.

Each of the access points may be connected to the telecommunications network via a common hub. Communications between the access points and the common hub may be by any suitable mechanism—e.g. WiFi, local LAN or Ethernet.

Alternatively the APs may be connected directly to the concentrator by DSL or other IP connections.

The method may further include recording the association of the access points as a cluster. For example, this recording step may be performed when the access points are purchased or when they are installed in the building occupying the region where the telecommunications network coverage is to be provided by the access points.

The calculating step may include calculating the path loss between each pair, or plurality, of access points.

The method may include designating at least one of the access points located near an edge of the region as a gateway access point.

The calculating step may include setting for each access point the others of the access points to which a terminal registered with that access point can be handed over or reselected. When one or more gateway access points is provided, the step of setting for each access point the others of the access points to which a terminal registered therewith can be handed over or reselected is performed such that the terminal is always handed over to or reselects a gateway access point before leaving the region where coverage is provided by the access points.

One or more pilot units, which operate only in a receive mode, may be provided for making measurements to enhance the configuration process. Pilot units may be advantageously positioned at the edge of the region, or at other key locations within the region.

In the embodiment the method of providing telecommunications network radio coverage in a region allows the parameters of the access points to be set automatically. Before the configuration procedure begins a moderately skilled technician positions the access points at locations within the region where telecommunications network radio coverage is to be provided that he or she considers will be advantageous. The configuration procedure will then automatically calculate the optimum parameters for each access point and configure the access points to provide telecommunications network radio coverage within the region.

According further to the system described herein, a telecommunications network for providing radio coverage in a region includes a plurality of associated access points, a device for causing during a configuration procedure one or more of the plurality of access points to transmit in turn whilst the others of said access points are caused to receive only and to measure the received signal at each of the other of the access points, a calculating device for calculating the optimum parameters for each of said access points on the basis of the measurements, and a configuring device for configuring each of said access points in accordance with the calculated parameters.

BRIEF DESCRIPTION OF THE DRAWINGS

Embodiments of the system described herein will now be described by way of example, with reference to the accompanying drawings, in which.

DETAILED DESCRIPTION OF EMBODIMENTS OF THE INVENTION

Figure 1:
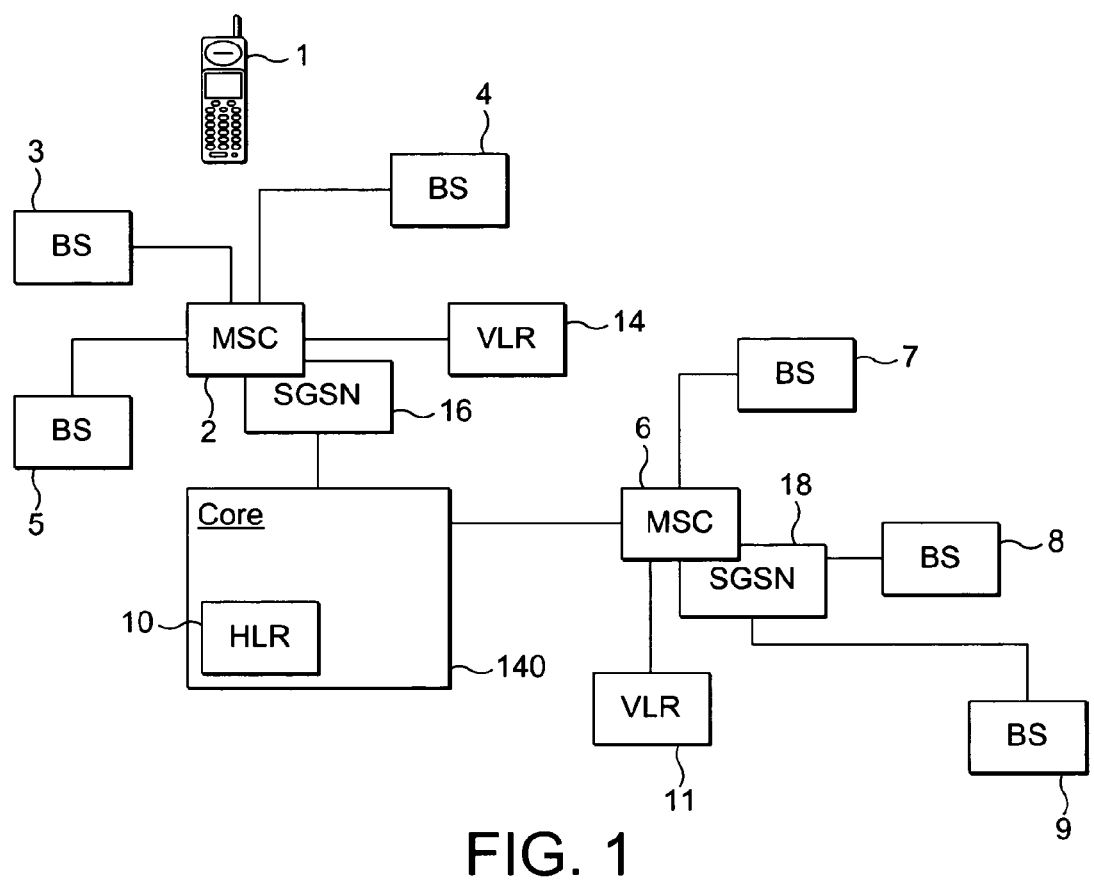
FIG. 1 is a diagrammatic drawing of certain elements of a mobile telecommunications network.

Certain elements of a mobile telecommunications network, and its operation, will now briefly be described with reference to FIG. 1.

Each base station (BS) corresponds to a respective cell of its cellular or mobile telecommunications network and receives calls from and transmits calls to a mobile terminal in that cell by wireless radio communication in one or both of the circuit switched or packet switched domains. Such a subscriber's mobile terminal is shown at 1. The mobile terminal may be a handheld mobile telephone, a personal digital assistance (PDA) or a laptop computer equipped with a datacard.

In a GSM mobile telecommunications network, each base station comprises a base transceiver station (BTS) and a base station controller (BSC). A BSC may control more than one BTS. The BTSs and BSCs comprise the radio access network.

In a UMTS mobile telecommunications network, each base station comprises a node B and a radio network controller (RNC). An RNC may control more than one node B. The node B's and RNC's comprise the radio access network.

In the proposed LTE mobile telecommunications network, each base station comprises an eNode B. The base stations are arranged in groups, and each group of base stations is controlled by a Mobility Management Entity (MME) and a User Plane Entity (UPE).

Conventionally, the base stations are arranged in groups and each group of base stations is controlled by one mobile switching centre (MSC), such as MSC 2 for base stations 3, 4 and 5. As shown in FIG. 1, the network has another MSC 6, which is controlling a further three base stations 7, 8 and 9. In practice, the network will incorporate many more MSCs and base stations than shown in FIG. 1. The base stations 3, 4, 5, 7, 8 and 9 each have dedicated (not shared) connection to their MSC 2 or MSC 6—typically a cable connection. This prevents transmission speeds being reduced due to congestion caused by other traffic.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6. The SGSNs 16, 18 are equipped with an equivalent to the VLRs 11, 14 used in the packet switched domain.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) that is not visible on the card and is not known to the subscriber. The subscriber is issued with a publicly known number, that is, the subscriber's telephone number, by means of which callers initiate calls to the subscriber. This number is the MSISDN.

The network includes a home location register (HLR) 10 which, for each subscriber to the network, stores the IMSI and the corresponding MSISDN together with other subscriber data, such as the current or last known MSC or SGSN of the subscriber's mobile terminal.

When mobile terminal 1 is activated, it registers itself in the network by transmitting the IMSI (read from its associated SIM card) to the base station 3 associated with the particular cell in which the terminal 1 is located. In a traditional network, the base station 3 then transmits this IMSI to the MSC 2 with which the base station 3 is registered. In a network using the functionality described in 3GPP TS 23.236, the base station follows prescribed rules to select which MSC to use, and then transmits this IMSI to the selected MSC.

MSC 2 now accesses the appropriate storage location in the HLR 10 present in the core network 140 and extracts the corresponding subscriber MSISDN and other subscriber data from the appropriate storage location, and stores it temporarily in a storage location in a visitor location register (VLR) 14. In this way, therefore the particular subscriber is effectively registered with a particular MSC (MSC 2), and the subscriber's information is temporarily stored in the VLR (VLR 14) associated with that MSC.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, they enter the telephone number of the called party in the usual manner. This information is received by the base station 3 and passed on to MSC 2. MSC 2 routes the call towards the called party. By means of the information held in the VLR 14, MSC 2 can associate the call with a particular subscriber and thus record information for charging purposes.

The functionality just described may also apply to the proposed LTE mobile telecommunications network, with its eNode Bs performing the functionality of the base stations and the MME/UPE performing the functionality of the MSCs/VLRs. It is also to be appreciated that the functionality just described is one example of a network in which the embodiments of the invention may be implemented.

Figure 2:
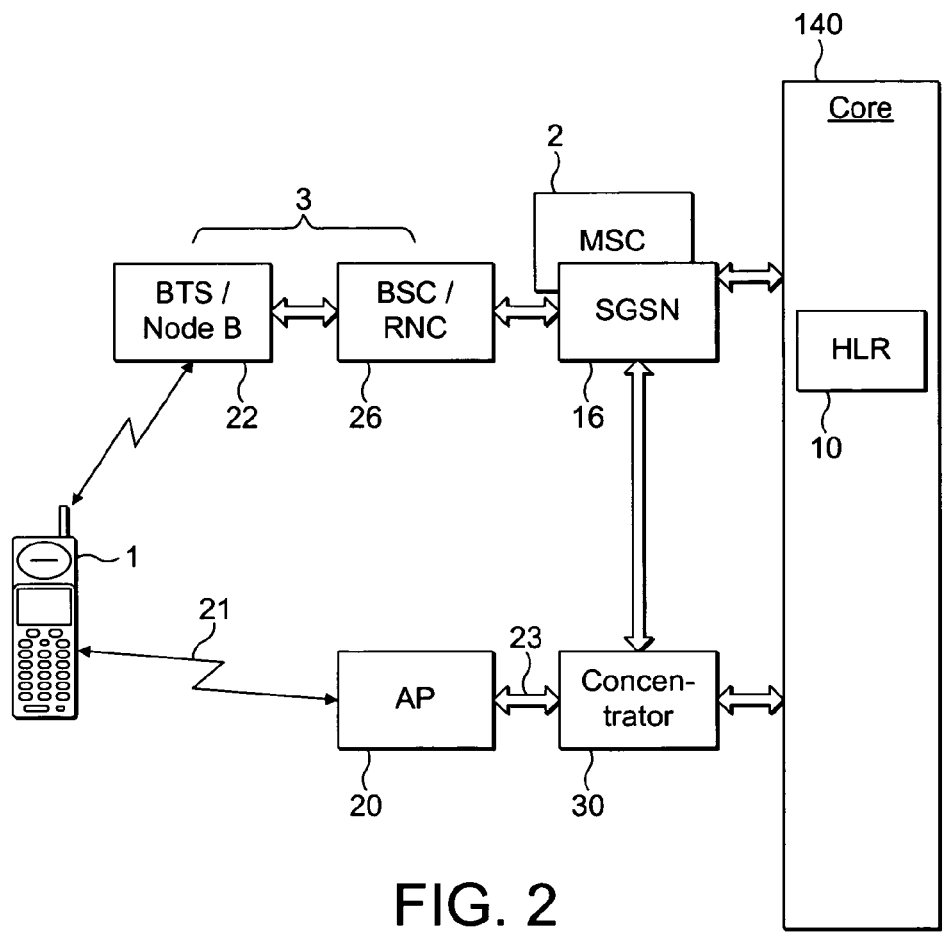
FIG. 2 shows a modified mobile telecommunications network for receiving IP based communications from an access point in addition to communications from a conventional base station.

FIG. 2 shows elements for providing access to a GSM or UMTS network by both a conventional base station 3 and an access point (AP 20). The AP 20 communicates with the mobile terminal 1 via a radio link 21.

In the embodiments, the radio link 21 between the AP 20 and the mobile terminal 1 uses the same cellular telecommunication protocols as the conventional base station 3 but with a smaller range—for example 25 meters. The AP 20 appears to the mobile terminal 1 as a conventional base station, and no modification to the mobile terminal 1 is required to operate with the AP 20. The AP 20 performs a role corresponding to that of a GSM BTS 22 and BSC 26 and/or UMTS Node B and RNC and/or an LTE eNode B.

Communications 23 between the access point 20 and the core network 140 are IP based communications, and may be, for example, transmitted over a broadband IP network (and routed via the Internet). The communications are routed via a concentrator 30. The access point 20 converts the cellular telecommunications transport protocols used for signaling in conventional GSM or UMTS networks used between the mobile terminal 1 and the AP 20 to IP based signalling.

The connection 23 between the access point 20 and the concentrator 30 may use the PSTN telephone network. Typically a DSL cable connection connects the access point 20 to the PSTN network. The data is transmitted between the access point 20 and the concentrator 30 by IP transport/DSL transport (a backhaul connection).

The access point 20 may be connected to the concentrator 30 by means other than a DSL cable and the PSTN network. For example, the access point 20 may be connected to the core network 140 by a dedicated cable connection that is independent of the PSTN, or by a satellite connection between the access point 20 and the concentrator 30.

Using an access point 20 connected to the core network via an IP network does have advantages. Existing broadband DSL connections can be used to link mobile terminals with the network core 140 without using the capacity of the mobile telecommunications network radio access network, or where there is no conventional radio access network coverage. For example, UMTS coverage could be provided by an access point 20 where there is no conventional UMTS coverage.

AP 20 may be configured to serve a WLAN located in a home or office, in addition to GSM/UMTS/LTE networks. The WLAN could belong to the subscriber of the mobile terminal 1, or be an independently operated WLAN.

The owner of AP 20 can program the AP so that it is either "open" or "closed", whereby an open AP is able to carry communications from any mobile device in the GSM/UMTS network, and a closed AP is only able to carry communications from specific pre-designated mobile devices.

With this background in mind, a first embodiment of the invention will now be described in relation to FIGS. 3 to 6.

A hub 200 is connected to a DSL line of the premises 202. The hub 200 serves six access points AP1, AP2, AP3, AP4, AP5 and AP6. All communications from the hub 200 are transmitted along the DSL and to an Internet Service Provider (ISP). Typically, the ISP will receive communications from multiple hubs and APs, and so will include a Digital Subscriber Line Access Multiplexer (DSLAM) and a data switch, for multiplexing a plurality of customer communications and routing them to the concentrator 30.

Each AP has a unique identifier (AP ID). The AP ID may be a Media Access Control address (MAC address) identifying the access point. The MAC address is a generally unique code assigned to most forms of networking hardware. The address is generally permanently assigned to the hardware, so each access point has a unique MAC address. The access points may however be identified by some other form of unique access point identifier.

Additionally, the specific DSL connection into which the hub 200 is plugged has a unique ID (DSL ID).

The concentrator 30, or other supporting network functionality, may be configured to perform functionalities such as:
1) verifying the location of an AP;
2) verifying whether or not a subscriber is entitled to use an AP; and/or
3) verifying whether or not a subscriber is entitled to a reduced tariff when using an AP.

An advantage of the concentrator 30 is that it simplifies the processing required by the core network 140. In other words, by having the concentrator 30 perform the additional functionalities required due to incorporating APs in the telecommunications network little or no additional software or hardware modifications need to be made to the core network 140. In this regard, firstly considering the AP verification functionality, once the geographic location at which an AP is plugged into the mobile telecommunications network, the concentrator 30 is able to use this information to verify the location of the AP each time the subscriber seeks to use their mobile terminal through the AP.

The APs in the premises 202 are connected to the hub 200 by any suitable mechanism. For example, the APs may be connected by a WLAN radio connection, by an Ethernet connection, by powerline communication or by any other suitable means.

In an alternative configuration each Access Point may be independently connected directly to the concentrator by DSL or other IP connections.

Figure 4:
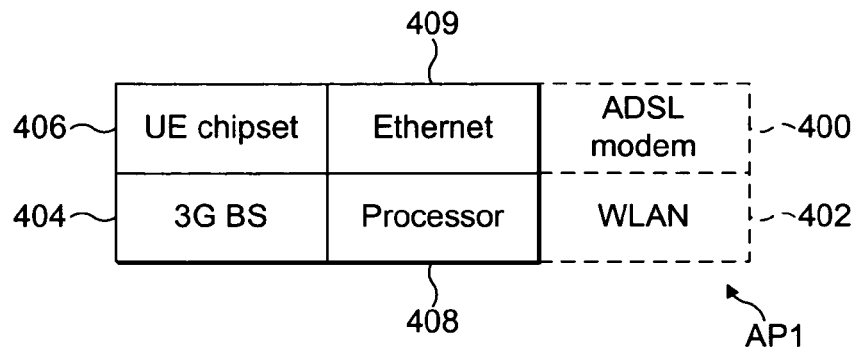
FIG. 4 shows the functional elements of an access point in accordance with an embodiment of the system described herein.

FIG. 4 shows schematically the functional elements of one of the APs, for example AP1. Optional elements are shown with dotted lines. The AP1 may comprise an ADSL modem 400 for communicating with the concentrator. The AP may also comprise a WLAN module 402, or an Ethernet module 409, for communicating with the hub 200. The WLAN module 402 may additionally be used for normal WLAN service to subscribers. The AP1 additionally comprises a 3G base station module 404 for communicating with mobile terminals wirelessly using UMTS communications protocols in the same way as a conventional macro base station, albeit with a reduced range. The AP1 further comprises a mobile terminal (UE) chip set 406 to enable the AP1 to measure the ambient radio conditions. Finally, the AP1 includes a processor 408.

Although FIG. 4 shows the functional elements of access point AP1, access points AP2, . . . , AP6 also comprise the same or equivalent functional elements.

A method of configuring the access points AP1, . . . , AP6 will be described with reference to the flow chart of FIG. 5.

However, before the configuration process begins, the access points are located in the premises 202 in positions that are considered to be most appropriate having regard for the layout of the premises 202 and possibly other factors, such as the materials from which the premises 202 are constructed. It is envisaged that the positioning of the access points in the premises will be performed by a moderately skilled technician and not by a highly skilled cellular network planning specialist. It is envisaged that the survey to determine the position of the access points will take no more than a few minutes per access point. No radio measurements are expected to be taken by the technician to determine where to position the access points.

As mentioned above, each of the access points is connected to the hub 200 by any suitable means. The hub 200 is in turn connected to the concentrator 30.

In an alternative configuration each Access Point may be independently connected directly to the concentrator by DSL or other IP connections.

Figure 5:
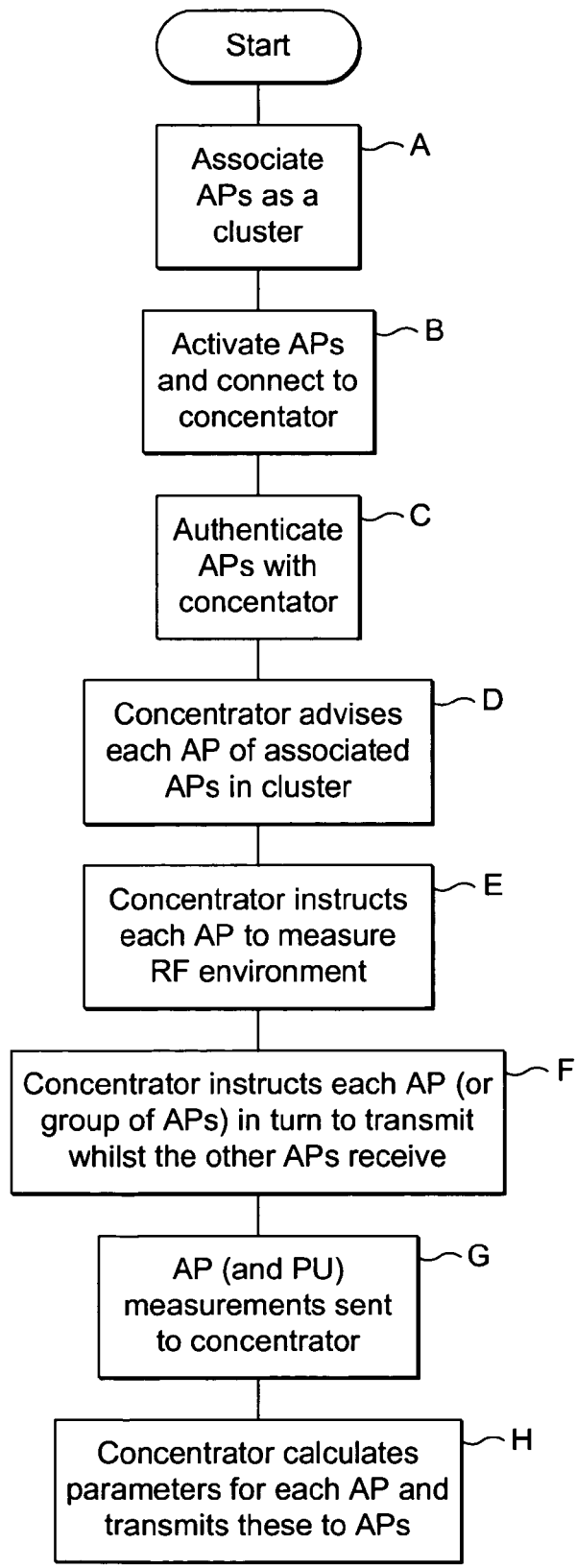
FIG. 5 shows steps performed for configuring the associated access points in accordance with an embodiment of the system described herein.

In step A of FIG. 5, prior to activation of the access points AP1, . . . , AP6, they are recorded with the concentrator 30 as being a cluster of associated access points. This recording process may take place when the access points are purchased, after they are positioned at the premises 202 or at any other convenient time before the access points are activated.

At step B the access points AP1, . . . , AP6 are activated and establish communication with the hub 200, and, via the hub 200, to the concentrator 30.

At step C each of the access points performs a handshake with and is authenticated with the concentrator 30 by communicating via the hub 200. This handshake and authentication process may include confirming that the access points are at a permitted location (for example by confirming the DSL ID through which the hub 200 communicates.

At step D the concentrator 30 notifies each of the access points that it is a member of the cluster and provides each access point with identity information relating to the other access points of the cluster (for example the MAC address of each AP).

At step E the concentrator 30 instructs each access point to activate the receiver of its UE chipset 406 to measure the local RF environment. At this step the transmitter of the 3G base station 404 of each of the APs is inactive. At step E each AP will detect the presence of other macro base stations which may provide coverage in the area in which the premises 202 are located and may also identify other access points, not members of the cluster, that provide coverage in the area where the premises 202 are located. The measurements taken by each access point AP1, . . . , AP6 at step E are transmitted via the hub 200 to the concentrator 30, and are passed to the processor 204.

At step F the concentrator 30 then instructs, via hub 200, AP1 to activate the transmitter of its 3G base station 404, whilst instructing each of the other access points AP2, AP3, AP4, AP5 and AP6 to activate the receiver of their UE chipset 406 (but to deactivate the transmitter of their 3G base station 404). Each of the receiving access points AP2, AP3, AP4, AP5 and AP6, and any Pilot Units, then measure the strength of the signal received from AP1. The receiving access points AP2, AP3, AP4, AP5 and AP6 are able to identify radio transmissions from AP1 because these include an indentifier of AP1 and the receiving access points were provided with details of the identifier of AP1 in the step D above. The measurements taken by each of the receiving access points, and any Pilot Units, are communicated via the hub 200 to the concentrator 30 at step G. The measurements are passed to the processor 204.

Steps F and G are repeated for each AP when activated as a transmitter (with the other APs acting as a receiver only, with their transmitters disabled). That is, the AP 2 will next be activated in transmitter mode, whilst the other access points AP1, AP3, AP4, AP5 and AP6 operate only in receiver mode. The measurements taken by each of the receiving APs is passed to the concentrator 30 via hub 200. Next, AP3 is operated in transmitter mode with the other access points AP1, AP2, AP4, AP5 and AP6 operating in receiving mode only. Again, the measurements taken by the receiving APs are passed to the concentrator 30 via the hub 200, and so on. During step F the transmit power of each of the APs is set by the concentrator 30.

Optionally Steps F and G may be repeated with more than one AP activated as a transmitter.

At step H the processor 204, connected to the concentrator 30, then processes each of the measurements received by performance of step F. The transmit power of each of the APs is known by the processor 204 as this was set by the concentrator 30. The processor 204 is therefore able to calculate the path losses between each pair of APs in the premises 202. An example table of these path losses that might be calculated by the processor 204 is shown below.

| AP | 1 | 2 | 3 | 4 | 5 | 6 |
|---|---|---|---|---|---|---|
|  | x | 7 | 5 | 7 | 3 | 1 |
|  | 7 | x | 7 | 8 | 8 | 6 |
|  | 5 | 7 | x | 10 | 8 | 9 |
|  | 7 | 8 | 10 | x | 8 | 7 |
|  | 3 | 8 | 8 | 8 | x | 9 |
|  | 1 | 6 | 9 | 7 | 9 | x |
| Total | 23 | 36 | 39 | 40 | 36 | 32 |

The highest number "10" indicates a minimum path loss, and the lower number "1" indicates a maximum path loss. The identity of the transmitting AP is shown by a "X" in an appropriate position in each row of the table, with the numbers in the row indicating the calculated path loss at each of the receiving APs.

The processor 204 then performs a calculation of the optimum parameters for each of the APs AP1, . . . , AP6. The detailed calculations performed by the processor 204 to derive the parameters for each AP do not form part of this invention. However, the calculation may include identifying which AP is located centrally within the building. This may be achieved, for example, by calculating the sum of the measured path losses in each column of the table. The column with the highest total (indicating the lowest path loss) is likely in many (but not all) situations to be the central AP. Typically, the central AP will be provided with parameters that set a relatively high transmit power for the 3G base station 404 of that AP.

The processor 204 may determine during step F that adequate radio coverage cannot be provided in the premises with the APs in their current configuration. For example, the processor may calculate that the transmit power required by an AP 3G base station 404 in use will exceed the maximum power permitted. If this occurs, the installer is instructed to relocate one or more AP or to add one or more APs to the cluster. The configuration process will then be repeated.

The processor may determine during step F that adequate radio coverage can be provided by fewer APs than initially installed. If this occurs, the installer is instructed to remove the relevant AP(s). The configuration process will then be repeated.

The parameters for each AP are communicated from the processor 204 to the concentrator 30, and from the concentrator 30 via the hub 200 to each AP, AP1, . . . , AP6 its set of parameters. The parameters may additionally include the scrambling code and cell ID selected by the processor 204 for each AP.

The access points AP1, . . . , AP6 are then all restarted and operated in accordance with their allocated parameters. A test call may then be made by the installer walking around the premises 202 with the call ongoing. During this call, the installer's mobile terminal continually reports the neighbour cells, RSCP (Received Signal Code Power) and ratio Ec/No (the ratio of the energy per chip, Ec, received by the mobile terminal to the spectral noise power density, No, received by the mobile terminal) of all the APs so that, for example, any black spots (gaps in the radio coverage) can be identified.

These measurement reports may be provided to the concentrator 30 and are then processed by the processor 204 which calculates whether any changes should be made to the parameters of any of the access points AP1, . . . , AP6. If changes to any of the APs are required, these are communicated to the concentrator 30, and to the relevant APs via the hub 200.

Figure 3:
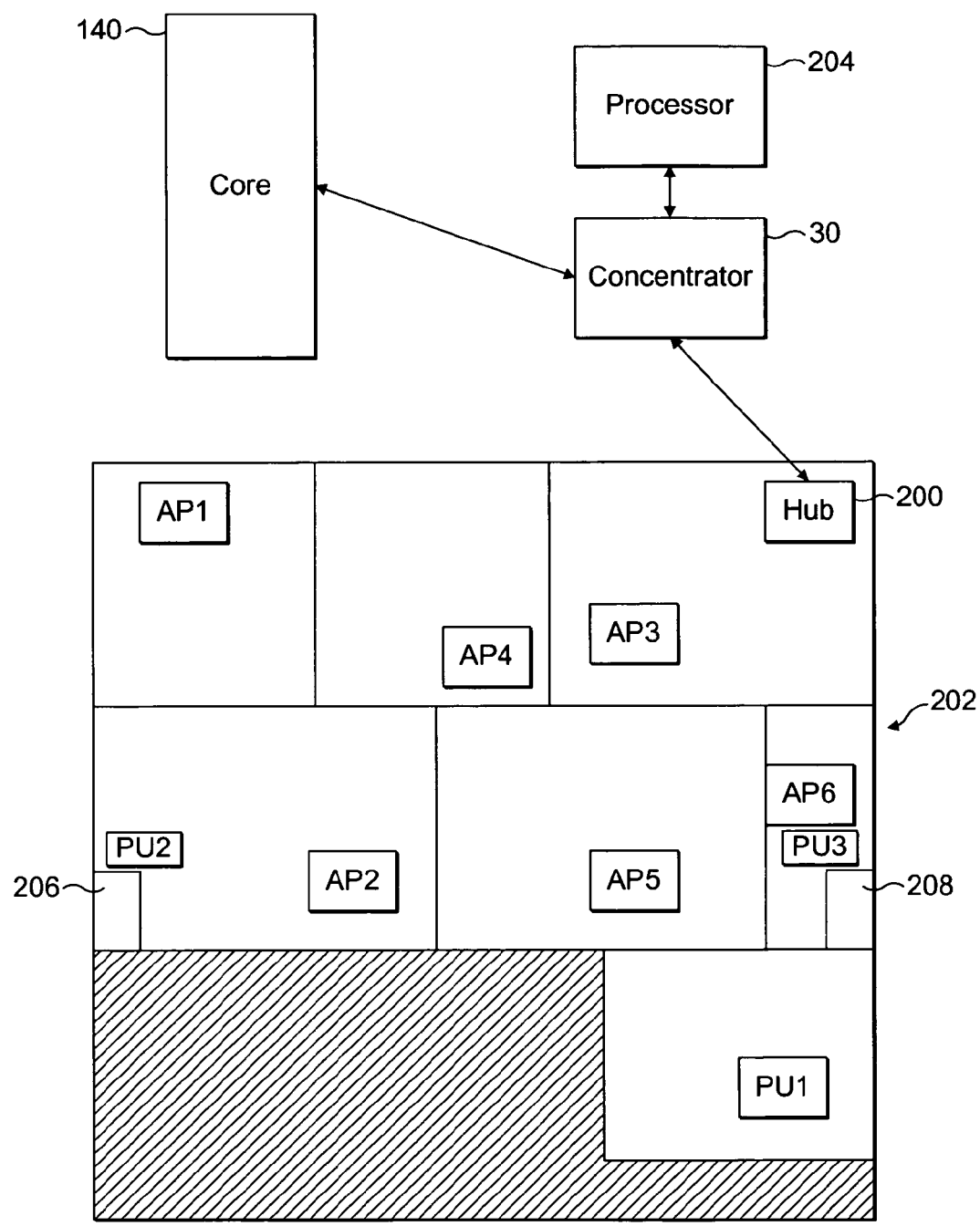
FIG. 3 shows a plurality of associated access points in a premises in accordance with an embodiment of the system described herein.
Figure 6:
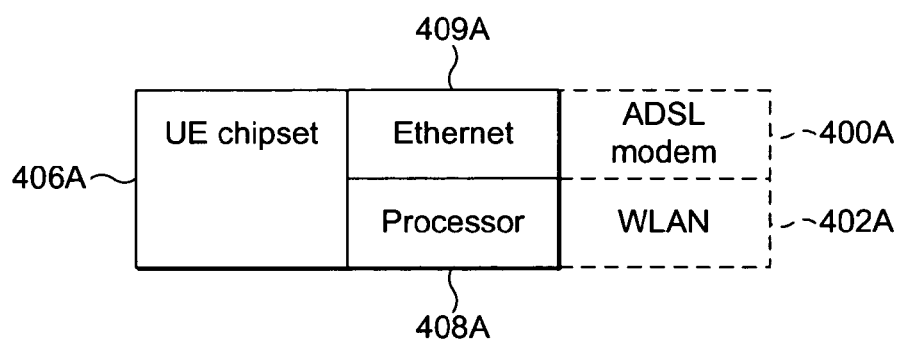
FIG. 6 shows functional elements of a pilot unit in accordance with an embodiment of the system described herein.

In order to facilitate selection of optimum parameters for the APs, one or more pilot units may optionally be provided. In FIG. 3 PU1 is provided at a location at the edge of the area where radio coverage by the APs is required—in the basement of the premises 202 in this example. In FIG. 3 PU2 and PU3 are provided at the entrance/exits of premises 202. The functional elements of PU1 are shown in FIG. 6. PU1 includes a UE chip set 406A, similar to the UE chipset 406 of AP1 in FIG. 4, a processor 408A similar to the processor 408 of AP1 and an Ethernet module 409A, similar to the Ethernet module 409 of AP1 in FIG. 4. PU1 may similarly include a DSL modem 400A and WLAN module 402A. corresponding to the like numbered elements of AP1 described in relation to FIG. 4. The PU1 need not include a 3G base station 404 of the type provided in AP1. PU2 and PU3 include corresponding elements to PU1.

When PU1 is provided, the step F discussed above is modified. During step F for each of the APs, AP1, . . . , AP6 when in the transmit mode, PU1 measures the signals received from the relevant AP. During step G the PU1 sends measurements of the received signal from the relevant AP via the hub 200 to the concentrator 30, for use by the processor 204. During step H the processor 204 will set the parameters for at least one AP, probably AP5 or AP6 in this example, such that the AP provides acceptable radio coverage at the location occupied by PU1. PU2 and PU3 operate similarly.

The PU may be removed from the premises 202 after the APs are configured. Alternatively the PU may be retained for ongoing AP monitoring and AP optimisation purposes.

A conventional mobile terminal can be used to provide the functionality of a PU.

If the PU is a fully capable mobile terminal, the PU may establish a communication session with a fixed known device after the APs are operational in order to measure and log KPIs (Key Performance Indicators).

One or more pilot units may be provided for a given cluster of associated APs.

As part of the calculation of the parameters for each AP by the processor 204 at step H, the processor 204 determines for each AP the neighbouring APs which a moving user is likely to use immediately after using that AP.

As mentioned above, a mobile terminal has an active mode and an idle/inactive mode. In the idle/inactive mode a mobile terminal "camps" on what is determined to be the best cell. As the mobile terminal moves around, the best cell changes and cell reselection is performed by the mobile terminal to change the cell on which the mobile terminal is camped.

In the active mode, in order to allow a mobile terminal to maintain a call when the mobile terminal moves outside the coverage area of a cell, the call must be switched to an alternative cell automatically. This process is referred to as "handover". The call must be routed to the new cell before handover can be effected whilst maintaining the connection with the old cell until the new connection is known to have succeeded. Handover is a time critical process requiring action to be taken before the radio link with the original cell degrades to such an extent that the call is lost. Handover requires synchronisation of events between the mobile terminal and the network.

In the active state a network-driven handover is performed when necessary, as described in 3GPP TS 25-331. In this state a mobile terminal scans the pilot channels of up to 32 cells neighbouring its current cell. These cells are defined in a neighbour cell list (NCL) transmitted to the mobile terminal by the current cell. In the conventional macro network the NCL is set manually for each cell as part of the complex network planning process. The mobile terminal forms a list of the best cells for possible handover based on the received signal strength and/or quality (i.e. the error rate in the received signal). The information in this list is passed to the core network 140 on an event-driven basis, e.g. when the signal strength or signal-to-noise ratio of one of the cells exceeds a threshold. The information list is used by a handover algorithm implemented in the core network 140. The algorithm that determines when handover occurs is not specified in the GSM or UMTS Standards. The algorithms essentially trigger a handover when the mobile terminal provides a measurement of a neighbour cell received signal at the mobile terminal below a predetermined quality received threshold, which typically has a relation to the quality of the received signal from the serving cell (e.g. better quality by some margin).

The processor 204 calculates and defines the NCL transmitted by each AP, AP1, . . . , AP6. For example, the processor 204 will be able to determine that the handover or reselection between AP1 and AP6 is unlikely to be required but that handover or reselection between AP1 and AP4 or AP2 is likely to be required. Therefore, the identity of APs 2 and 4 (but not AP 6) will be included in the NCL of AP1 as part of the parameter information transmitted during set up of AP1. The NCL of an AP may be amended over time if it is determined that handover/reselection to a particular AP in the NCL of an AP never occurs in practice, or that handover/reselection attempts to the AP always fail.

As discussed above, it is possible for the mobile terminal to be handed over to or to reselect a macro base station from any one of the access points AP1, . . . , AP6 in principle. However, in many instances it will be desirable to prevent handover to or reselection of a macro base station serving the area occupied by the premises 202 when a user within the building, for example, moves towards a window of the building (which would result in the signal strength of the macro base station increasing, which could trigger handover or reselection).

In accordance with a feature of the present invention, selectioned ones of the access points AP1, . . . , AP6 are defined as gateway APs. The selection of the "gateway" APs will be determined manually during the placement of the APs by the installer and the processor 204 will be advised of the identity of the gateway APs. In the FIG. 3 arrangement, AP2 and AP6 will be designated as gateway APs as these are the nearest APs to doors 206 and 208 of the premises 202. During step H of FIG. 5 the processor 204 will set the parameters of AP1, AP4, AP3 and AP5 so as not to allow handover to any macro base station—for example by excluding macro base stations from the NCL for each of those APs. The gateway APs, AP2 and AP6, will have included in their NCLs the identities of neighbouring macro base stations in the vicinity of the doors 206 and 208, respectively.

Optionally, the processor 204 may be arranged to tend to provide the gateway APs, AP2 and AP6, with a higher transmit power than other APs, AP1, AP3, AP4 and AP5 so that these gateway APs provide coverage in the area to the exterior of the premises 202 near the doors 206 and 208. Optionally measurements from PU2 and PU3, located near the doors 206 and 208 of premises 202 in FIG. 3, may be used to optimise the transmit power for the gateway APs, AP2 or AP6.

When the user within the premises 202 moves towards one of the doors 206,208 the parameters of the APs AP1, AP3, AP4 and AP5 will be such that they will cause the users mobile terminal to hand over to or reselect one of the gateway APs, AP2 or AP6, prior to leaving the building, so that the user's mobile terminal can subsequently select an appropriate macro base station as they move away from the premises 202.

In the embodiments described above, the AP is configured to appear to the mobile terminal as a conventional base station that communicates with the UE using GSM/UMTS/LTE protocols in accordance with the Standards (where they exist) and the licensed radio spectrum. Alternatively, the AP could communicate with the UE by any other suitable technology—for example, by a Bluetooth® connection, WiFi or another unlicensed mobile access (UMA) protocol, which allows the GSM/UMTS/LTE features to be provided using a non-GSM/UMTS/LTE bearer technology.

After the initial configuration of the APs, periodic measurements and calculations by processor 204 (e.g. once a week) may be performed by repeating steps E, F and G. Modifications to the parameters of one or more APs may be determined to be advantageous in step H, and the parameters of the relevant AP(s) can then be modified.

The calculation performed by processor 204 associated with the concentrator 30 may be performed elsewhere—e.g. in the core network 140 or in the hub 200.

The APs may be configured to handover a call to another AP in the cluster without any handover processing being performed by the core network 140.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method of providing telecommunications network radio coverage in a region, the method comprising:

identifying a plurality of associated access points as a cluster that provides radio coverage in the region; and performing a configuration procedure by:

notifying each of the plurality of associated access points of identity information of others of the plurality of associated access points in the cluster;

causing at least two of the plurality of access points to transmit in turn while the others of said access points are caused to receive only;

obtaining measurements of received signals at each of the other receive-only access points for each iteration of the at least two access points transmitting signals in turn;

calculating optimum parameters for each of said access points on the basis of the measurements;

configuring each of said access points in accordance with the calculated parameters;

designating at least one of said access points located near an edge of the region as a gateway access point; and setting parameters of the plurality of associated access points, so that a mobile terminal registered with an access point of the cluster can only handover or reselect to a base station external to the cluster, when registered with the gateway access point.

2. The method of claim 1, wherein the access points are IP-transport connected base stations.

3. The method of claim 2, wherein the IP transport connection comprises a DSL broadband connection.

4. The method of claim 1, wherein the telecommunications network comprises a cellular telecommunications network including said access points and a plurality of macro base stations.

5. The method of claim 1, wherein each of the access points is connected to the telecommunications network via a common hub.

6. The method of claim 1, wherein calculating the optimum parameters includes calculating the path loss between each pair of access points.

7. The method of claim 1, wherein calculating the optimum parameters includes setting for each access point the others of the access points to which a terminal registered therewith can be handed over or reselected.

8. The method of claim 1, wherein, for each of the other access points of the cluster that is not designated as a gateway access point, setting the parameters of the plurality of associated access points includes setting parameters for each of the other access points, so that a terminal registered therewith can only be handed over or reselected to another access point of the cluster.

9. A telecommunications network for providing radio coverage in a region, the network comprising:

a plurality of associated access points identified as a cluster that provides radio coverage in the region;

a notifying device that notifies each of the plurality of associated access points of identity information of others of the plurality of associated access points in the cluster;

a device that causes, during a configuration procedure, at least two of the plurality of access points to transmit in turn while others of said access points are caused to receive only;

a measuring device that measures the received signal at each of the other receive-only access points for each iteration of the at least two access points transmitting signals in turn;

a calculating device that calculates optimum parameters for each of said access points on the basis of the measurements;

a configuring device that configures each of said access points in accordance with the calculated parameters;

a designating device that designates at least one of said access points located near the edge of said region as a gateway access point.

a setting device that sets parameters of the plurality of associated access points, so that a mobile terminal registered with an access point of the cluster can only handover or reselect to a base station external to the cluster, when registered with the gateway access point.

10. The network of claim 9, wherein the access points are IP-transport connected base stations.

11. The network of claim 10, wherein the IP transport connection comprises a DSL broadband connection.

12. The network of claim 9, wherein the telecommunications network comprises a cellular telecommunications network including said access points and a plurality of macro base stations.

13. The network of claim 9, wherein each of the access points is connected to the telecommunications network via a common hub.

14. The network of claim 9, wherein the calculating device is adapted to calculate the path loss between each pair of access points.

15. The network of claim 9, wherein the calculating device is adapted to set for each access point the others of the access points to which a terminal registered therewith can be handed over or reselected.

16. The network of claim 9, wherein, for each of the other access points of the cluster that is not designated as a gateway access point, setting the parameters of the plurality of associated access points includes setting parameters for each of the other access points, so that a terminal registered therewith can only be handed over or reselected to another access point of the cluster.

17. The method of claim 1, further comprising:

indicating reconfiguration of a physical layout of the plurality of associated access points of the cluster in accordance with the calculated parameters.

18. The method of claim 17, wherein indicating the reconfiguration of the physical layout includes determining that adequate radio coverage cannot be provided in the region with the plurality of access points in a current configuration and indicating relocation of at least one of the plurality of associated access points or indicating adding at least new access point to the plurality of associated access points.

19. The method of claim 17, wherein indicating the reconfiguration of the physical layout includes determining that adequate radio coverage can be provided in the region by fewer access points and indicating removal of at least one of the plurality of associated access points.

20. A method of providing telecommunications network radio coverage in a region, the method comprising:

identifying a plurality of associated access points as a cluster that provides radio coverage in the region; and performing a configuration procedure by:

causing at least two of the plurality of access points to transmit in turn while the others of said access points are caused to receive only;

obtaining measurements of received signals at each of the other receive-only access points for each iteration of the at least two access points transmitting signals in turn;

calculating optimum parameters for each of said access points on the basis of the measurements;

configuring each of said access points in accordance with the calculated parameters;

indicating reconfiguration of a physical layout of the plurality of associated access points of the cluster in accordance with the calculated parameters;

designating at least one of said access points located near an edge of the region as a gateway access point; and setting parameters of the plurality of associated access points, so that a mobile terminal registered with an access point of the cluster can only handover or reselect to a base station external to the cluster, when registered with the gateway access point.

21. The method of claim 20, wherein indicating the reconfiguration of the physical layout includes determining that adequate radio coverage cannot be provided in the region with the plurality of access points in a current configuration and indicating relocation of at least one of the plurality of associated access points or indicating adding at least new access point to the plurality of associated access points.

22. The method of claim 20, wherein indicating the reconfiguration of the physical layout includes determining that adequate radio coverage can be provided in the region by fewer access points and indicating removal of at least one of the plurality of associated access points.

23. A method of providing telecommunications network radio coverage in a region, the method comprising:

identifying a plurality of associated access points as a cluster that provides radio coverage in the region; and performing a configuration procedure by:

causing one or more of the plurality of access points to transmit in turn while the others of said access points are caused to receive only;

obtaining measurements of received signals at each of the other receive-only access points;

calculating optimum parameters for each of said access points on the basis of the measurements;

configuring each of said access points in accordance with the calculated parameters;

designating at least one of said access points located near an edge of the region as a gateway access point; and setting parameters of the plurality of associated access points, so that a mobile terminal registered with an access point of the cluster can only handover or reselect to a base station external to the cluster, when registered with the gateway access point.

\* \* \* \* \*